(12) United States Patent
Tanaka et al.

(10) Patent No.: US 7,203,958 B2
(45) Date of Patent: Apr. 10, 2007

(54) PROGRAM USE AUTHORIZATION METHOD

(75) Inventors: Hiroshi Tanaka, Kawasaki (JP); Junko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 10/190,735

(22) Filed: Jul. 9, 2002

(65) Prior Publication Data
US 2003/0163688 A1 Aug. 28, 2003

(30) Foreign Application Priority Data
Feb. 27, 2002 (JP) ............................. 2002-050695

(51) Int. Cl.
*H04L 9/00* (2006.01)

(52) U.S. Cl. .............................. 726/19; 726/9; 726/20; 713/172; 705/59

(58) Field of Classification Search .................... 726/9, 726/19, 20; 713/172; 705/59
See application file for complete search history.

(56) References Cited

U.S. PATENT DOCUMENTS 4,907,272 A 3/1990 Hazard et al.
5,710,817 A * 1/1998 Sjooquist ..................... 713/159
5,952,641 A * 9/1999 Korshun ...................... 235/382
6,169,976 B1 * 1/2001 Colosso ....................... 705/59
6,226,747 B1 * 5/2001 Larsson et al. ............... 726/31
6,317,830 B1 * 11/2001 Stolz .......................... 713/168
2001/0042054 A1* 11/2001 Dietrich et al. ............. 705/405

FOREIGN PATENT DOCUMENTS

JP 11-154086 6/1999
JP 2001-216149 8/2001

* cited by examiner

*Primary Examiner*—Gilberto Barrón, Jr.
*Assistant Examiner*—Jung Kim
(74) *Attorney, Agent, or Firm*—Staas & Halsey LLP

(57) ABSTRACT

First and second codes specific to each program are prepared. The first code is encrypted to generate a first encrypted code that encrypts the second code to generate a second encrypted code. The second encrypted code is stored in a memory medium. An install key that the user needs to input is made by combining the first code and the second code. To authorize installation, the first code contained in the input install key is converted into the first encrypted code in the medium, and a computer on which a program is installed obtains the first encrypted code and generates the second encrypted code by encrypting the second code contained in the install key on the basis of the first encrypted code. Then, the computer reads out the second encrypted code stored in the medium and compares both of them, thereby giving the installation authorization.

17 Claims, 20 Drawing Sheets

PROGRAM USE AUTHORIZATION METHOD

BACKGROUND OF THE INVENTION

1. Field of the Invention

The present invention relates to a program use authorization method and a program use authorization program to prevent programs from being illegally installed or executed.

2. Description of the Related Art

The method of preventing illegal installation of programs by using a given identifier (ID) such as an install key (or a product key) is generally practiced. That is, when installing a program, a user inputs an install key in a computer. The computer collates the input install key with the install key in the program, and allows program installation if the input install key corresponds with the install key in the program.

An install key to be given to the user is, for example, described on a print enclosed in the package of a storage medium (such as a CD-ROM) storing a program, or described on mail to be sent to the user.

The legal user possessing the printed install key can install the program properly by inputting the install key at the time of installation.

However, others can easily know the printed install key by peeping at it: those other than the user with legal authority to use a program may install the program illegally after obtaining the install key.

To prevent such illegal conduct, a memory medium (an IC card, etc.) storing the install key is provided to the authorized user, and program installation is allowed on the condition that before a program is installed, the memory medium is connected to a device on which the program is installed. In other words, authorization is given by comparing the install key stored in a memory medium with the install key in the program. As the install key is stored in a memory medium, the install key itself is not displayed externally so that illegal installation can be prevented unless the memory medium itself is stolen and decrypted. If the memory medium is stolen and the install key is decrypted, however, illegal installation may be executed.

Therefore, even in the case of authorization using a memory medium, it is necessary to store the highest possible security level authorization data in the memory medium.

Likewise, in the above installation method using a memory medium, a program can freely be started and executed after the program is installed, and therefore, illegal use of the program cannot be prevented once the program is illegally installed.

SUMMARY OF THE INVENTION

It is therefore an object of the present invention to provide a program use authorization method using a memory medium that stores a higher security level authorization data.

Another object of the present invention is to provide a program use authorization method that executes authorization regarding the program use such as, installation, start and execution of the program, using a memory medium that stores specified authorization data.

According to the present invention, in order to attain the above objects, first and second codes specific to each program are prepared. The first code is encrypted to generate a first encrypted code that encrypts the second code to generate a second encrypted code. The second encrypted code is stored in a memory medium. An install key that the user needs to input is made by combining the first code and the second code (or the second encrypted code). To authorize installation, the first code contained in the input install key is converted into the first encrypted code in the memory medium, and a computer on which a program is installed obtains the first encrypted code and generates the second encrypted code by encrypting the second code contained in the install key on the basis of the first encrypted code. Then, the computer reads out the second encrypted code stored in the memory medium and compares both of them, thereby giving the installation authorization.

As shown above, the second encrypted code stored in a memory medium is different from the install key input by the user. Therefore, the install key cannot be known only by decrypting the second encrypted code, making it difficult to install the program illegally and realizing stricter security. Furthermore, a code to be stored in a memory medium is generated by combining more than one code, and as a result, a more complicated and difficult code is stored in the memory medium, contributing to security improvement.

In addition to at the time of installation, at the time of program start after the installation, and preferably during the execution of the program, illegal use of the program as well as simultaneous use of the program by more than one computer can be prevented by executing an authorization process that requires an exclusive memory medium with each program.

DESCRIPTION OF THE PREFERRED EMBODIMENTS

Embodiments of the present invention will now be described. It is to be noted however that the technical scope of the present invention is not limited to the embodiments. The method of generating authorization data and an install key in the following embodiment of the invention (hereinafter simply called the authorization data generation method) is carried out before a program is shipped (before provided to the user), authorization data to be stored in a memory medium (an IC card in the embodiment below) is generated as being specific to each program, and an install key specific to each program is stored in the corresponding program and reported to the authorized user. Then, the program use authorization method is carried out when the user installs the program on a given computer after obtaining the program in which the generated install key is registered and the IC card storing the generated authorization data. In this specification, the use of a program means installation, start and execution of a program.

Figure 1:
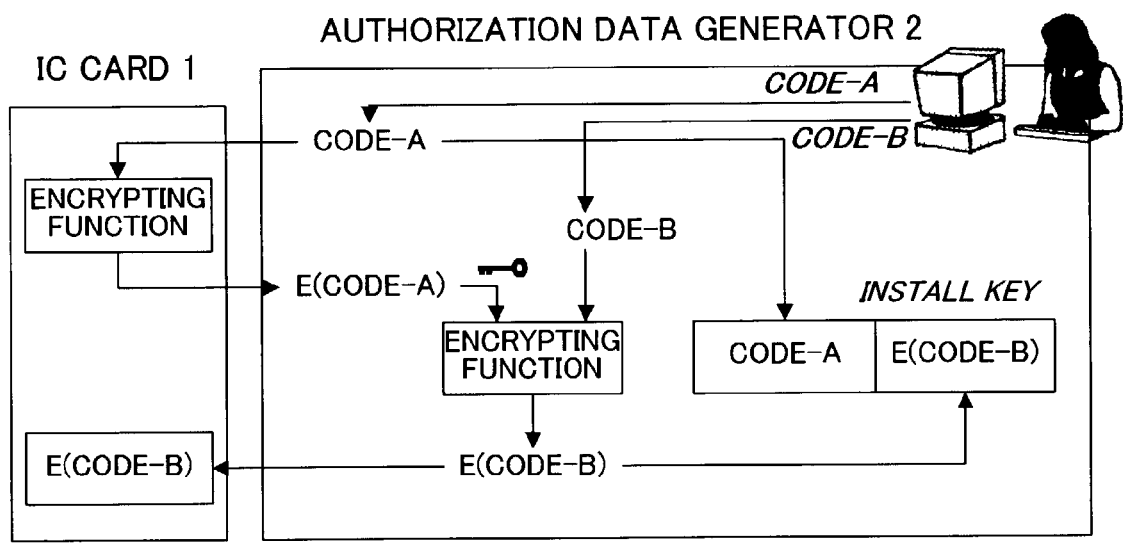
FIG. 1 illustrates a first authorization data generation method in the embodiment of the invention.
Figure 2:
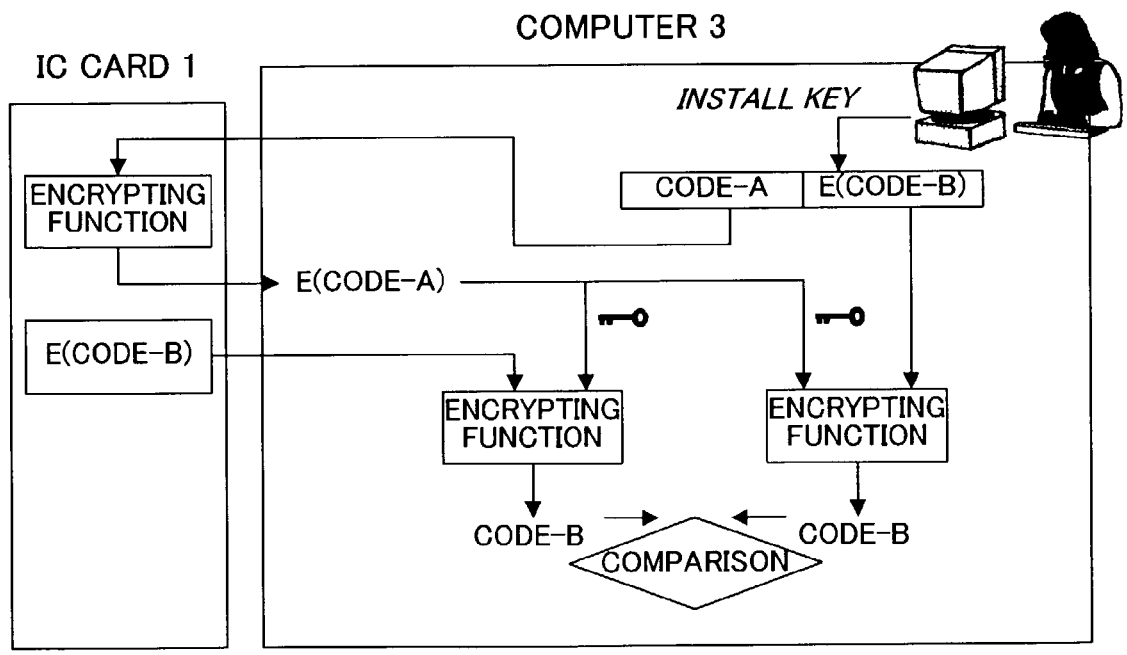
FIG. 2 illustrates a first installation authorization method in the embodiment of the invention.
Figure 13:
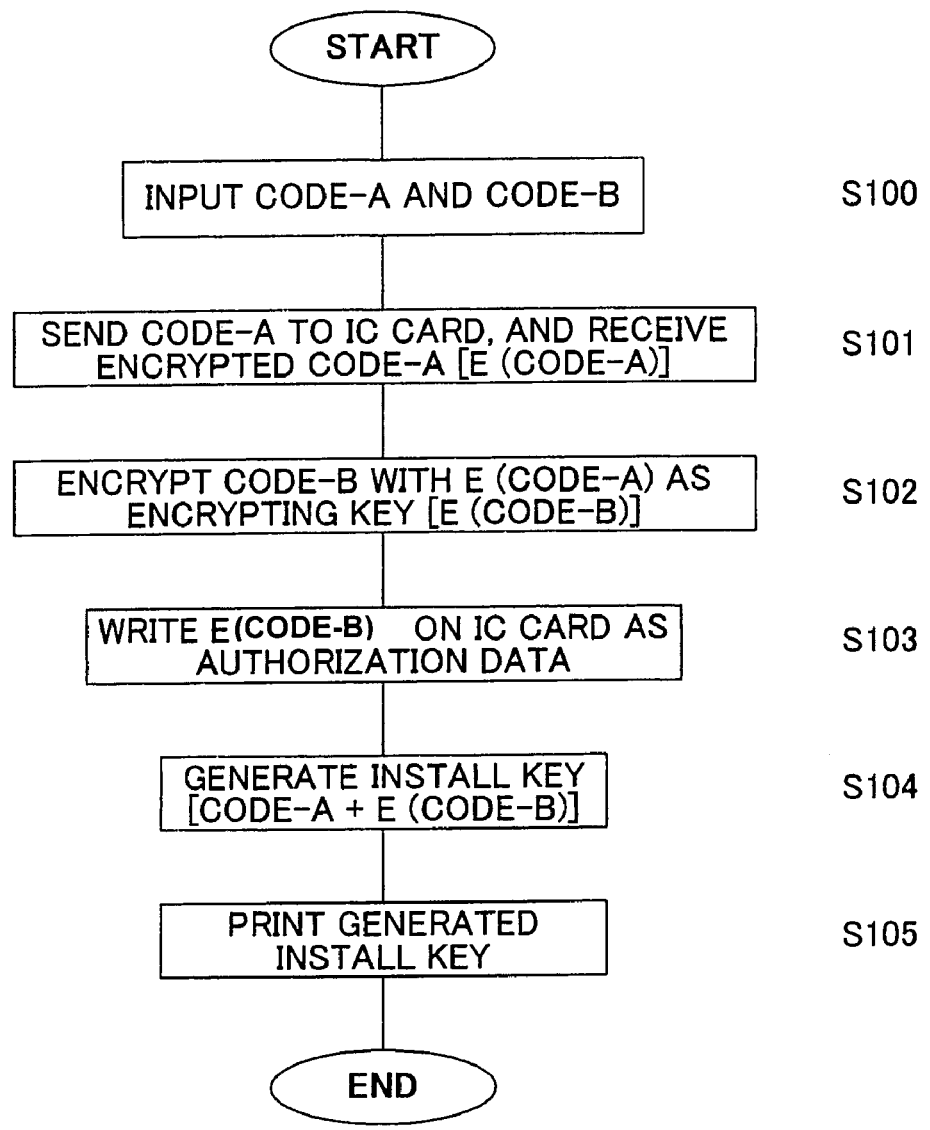
FIG. 13 is a process flowchart of the first authorization data generation method.
Figure 14:
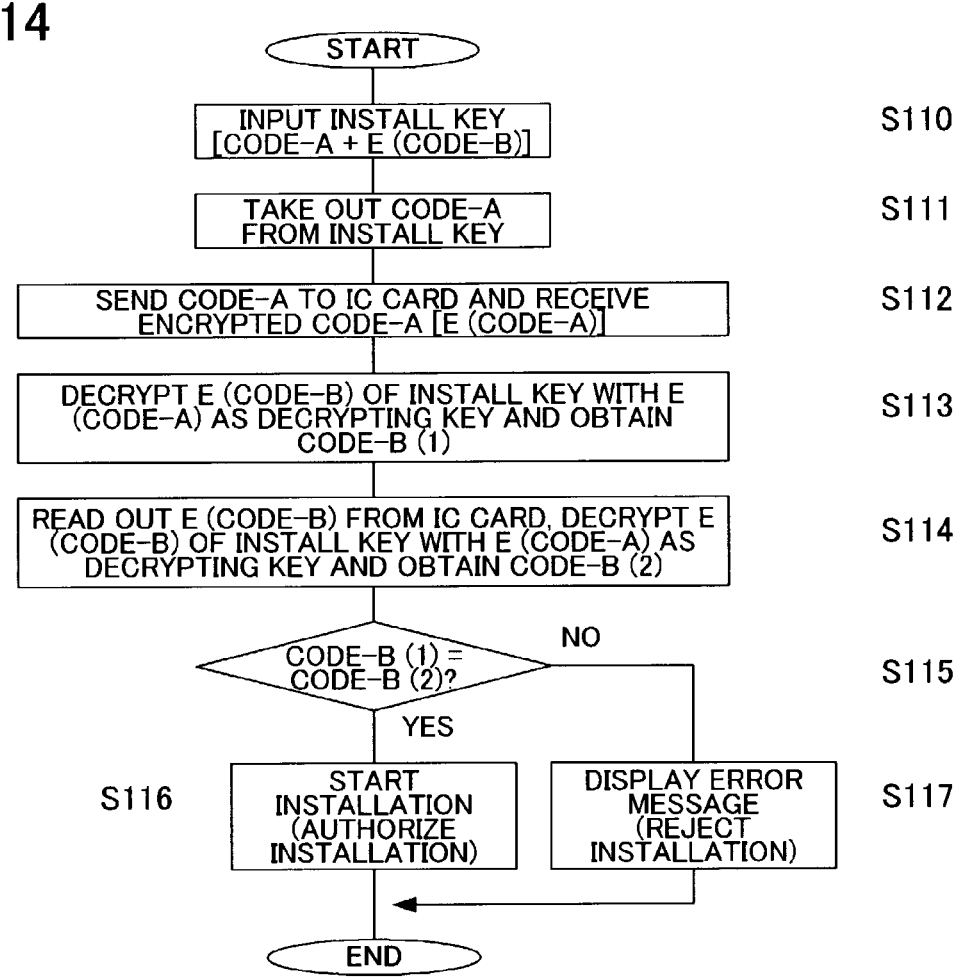
FIG. 14 is a process flowchart of the first installation authorization method.

FIG. 1 shows the first authorization data generation method in the embodiment of the invention, while FIG. 2 describes the first installation authorization method in the embodiment of the invention. FIG. 13 is a process flowchart for the first authorization data generation method, whereas FIG. 14 is a process flowchart for the first installation authorization method. First, the first authorization data generation method is described on the basis of the flowchart in FIG. 13, referring to FIG. 1. Each process in the authorization data generation method is executed by the authorization data generation program stored in a given computer (hereinafter called an authorization data generator) 2. An authorization data generator is connected to an IC card 1 for communication. The authorization data generator 2 may be equipped with an IC card reader/writer or connected to the IC card via an external IC card reader/writer.

In the authorization data generation method in the embodiment of the invention, two codes (Ids) are prepared for each program, and authorization data and an install key are generated using the two codes.

An operator inputs the two codes (Code-A and Code-B) into the authorization data generator. The respective two IDs (Code-A and Code-B) are prepared in advance as being specific to each program.

Code-A of the two IDS input in the authorization data generator 2 is sent to the IC card 1, the IC card 1 encrypts Code-A (encrypted Code-A is called E (Code-A)) using a preinstalled encrypting function and E (Code-A) is returned to the authorization data generator 2 (S101).

When receiving E (Code-A), the authorization data generator 2 encrypts Code-B input at step S100 (encrypted Code-B is called E (code-B)) using E (Code-A) as a encrypted key (S102), and writes E (code-B) on the IC card (S103).

Then, the authorization data generator generates an install key (Code-A+E (Code-B)) by combining Code-A and E (Code-B) (S104), and prints it out (S105). The printed install key is enclosed in the package of a storage medium storing the program and provided to the user. Or, it may be mailed separately from the memory medium storing the program. An IC card on which E (code-B) is written is also sent to the user by mail.

As shown above, two codes are used in the embodiment: one code is encrypted by a encrypting function stored in an IC card 1, and the other is encrypted by the encrypted code to generate authorization data (i.e. second encrypted data) to be stored in the IC card 1. For example, even if the IC card 1 is obtained illegally and the authorization data is decrypted by some means, the install key is unidentifiable and the program cannot be installed because the generated authorization data is different from the install key. Therefore, the level of security against illegal installation can be improved.

Next, the first installation authorization method by the generated authorization data and the install key is described on the basis of the flowchart in FIG. 14, referring to FIG. 2. Each process in the installation authorization method is executed by the installation authorization program contained in the program to be installed on a given computer 3.

The user sets the storage medium (a CD-ROM, etc.) storing the program to the computer 3, and sets the IC card received separately to the computer 3 as well. When the installation authorization program starts, the user checks the printed install key sent by mail, etc. and inputs the install key into the computer (S110).

The installation authorization program takes out Code-A from the install key (S111) and sends it to the IC card 1. The IC card 1 encrypts received Code-A by the encrypting function, and returns encrypted E (Code-A) to the installation authorization program (S112).

The installation authorization program decrypts input E (Code-B) of the install key by the encrypting function, using E (Code-A) received from the IC card 1 as a decrypting key, and obtains decrypted Code-B (S113).

Furthermore, the installation authorization program reads out E (Code-B) stored in the IC card 1, decrypts E (Code-B) stored in the IC card 1 by the encrypting function, using E (code-A) received from the IC card 1, and obtains decrypted Code-B (S114).

Then, Codes-B obtained at Steps S113 and S114 are compared with each other (S115). If they correspond with each other, installation of the program on the internal memory of the computer 3 is started (S116). If not, an error occurs (S117), and the program is not installed.

If both Codes-B correspond with each other, it indicates that the proper install key is input with the proper IC card 1 connected. In other words, only a person who knows the proper install key and possesses the proper IC card can install the program.

As indicated above, the program installation authorization is carried out by encrypting Code-A contained in the input install key by the IC card, decrypting both E (Code-B) contained in the install key and E (Code-B) contained in the IC card using encrypted E (Code-A) as a decrypting key, and comparing both Codes-B. In other words, authorization is performed by combining the install key and the IC card. Installation cannot be executed by obtaining only one of them, thereby making it difficult to install the program illegally and improving the security level.

Figure 3:
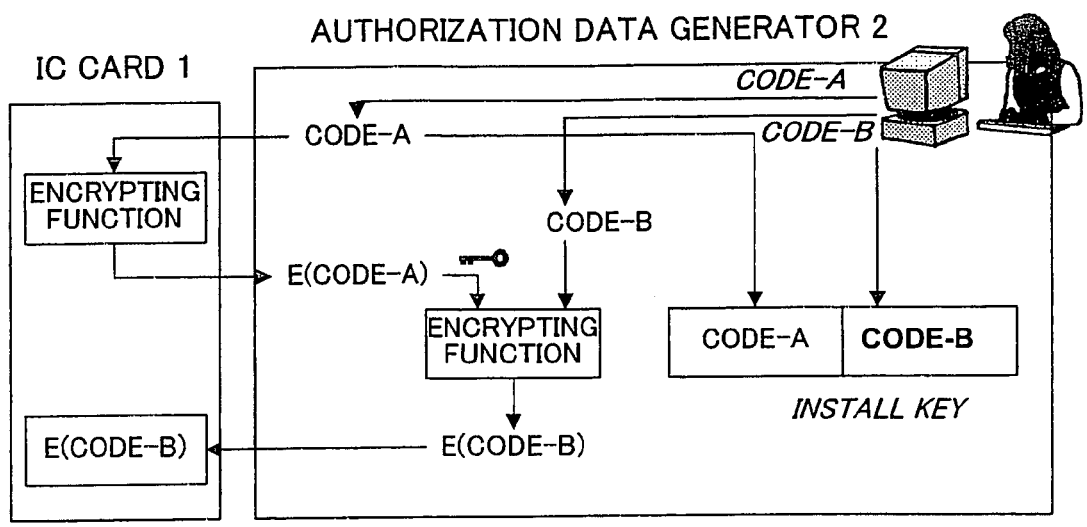
FIG. 3 illustrates a second authorization data generation method in the embodiment of the invention.
Figure 4:
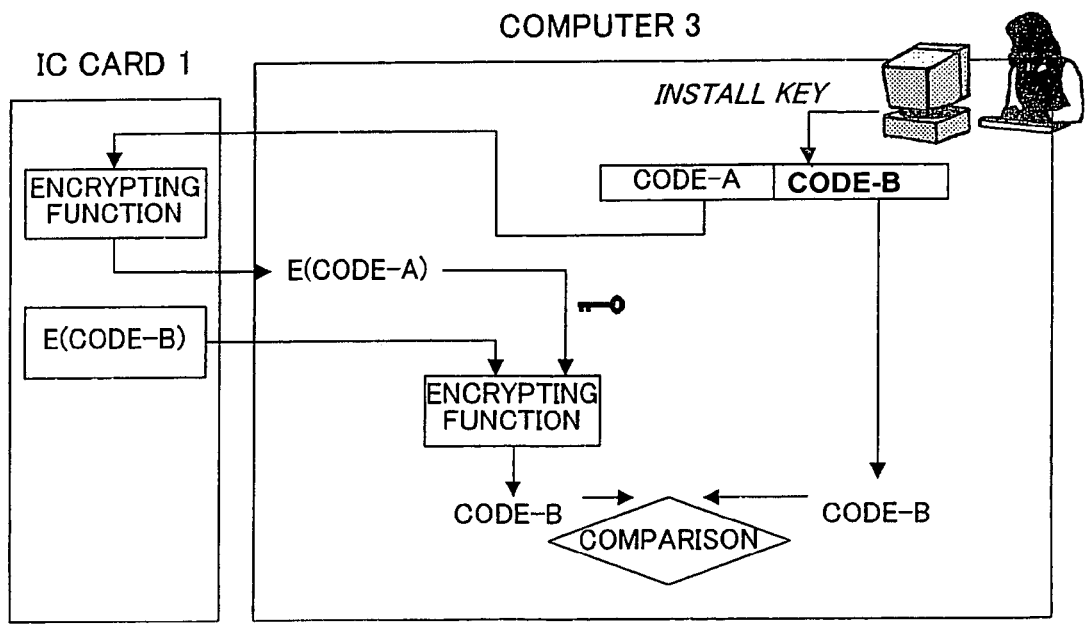
FIG. 4 illustrates a second installation authorization method in the embodiment of the invention.
Figure 15:
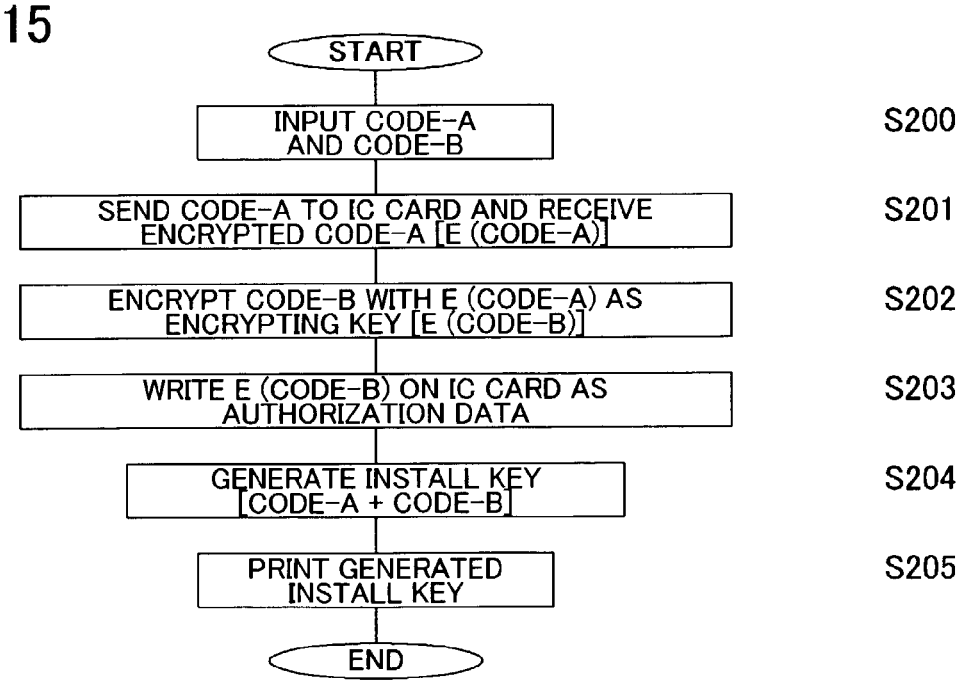
FIG. 15 is a process flowchart of the second authorization data generation method.
Figure 16:
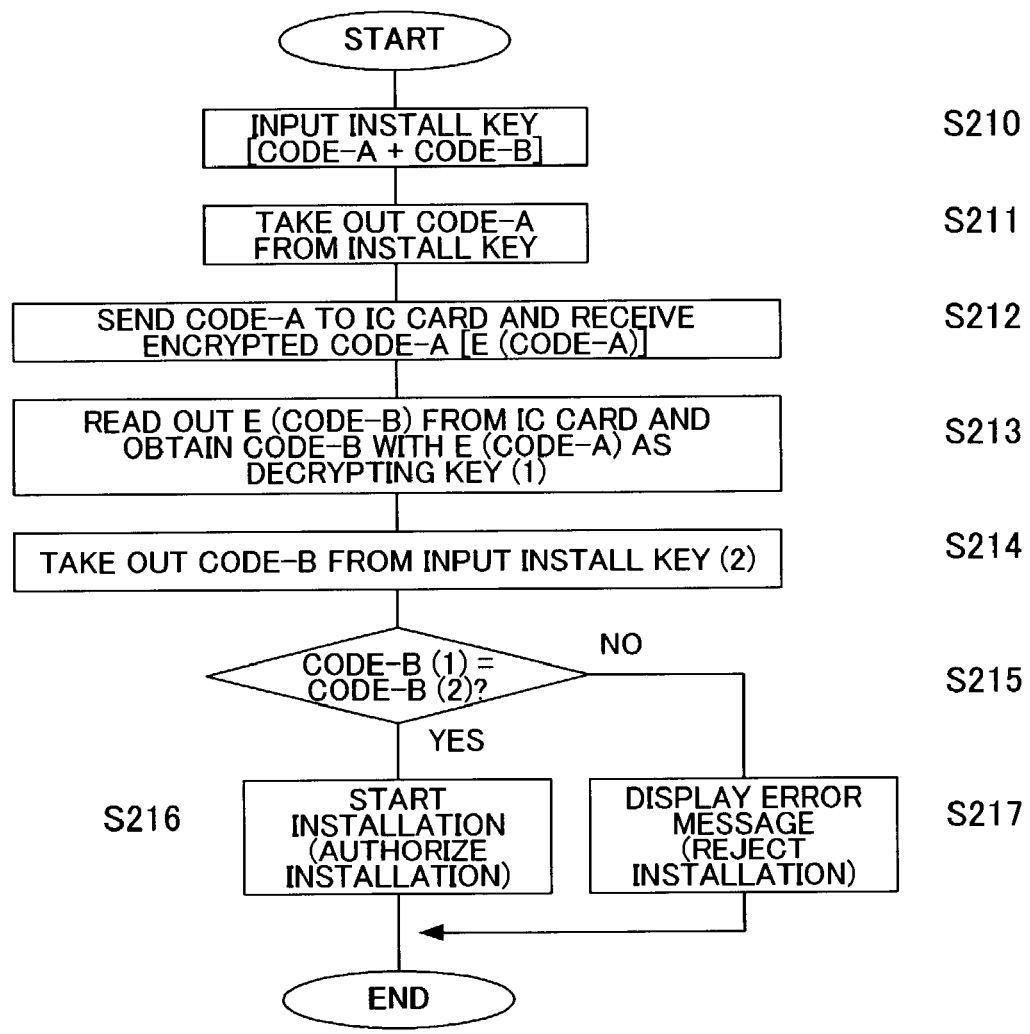
FIG. 16 is a process flowchart of the second installation authorization method.

FIG. 3 describes the second authorization data generation method in the embodiment of the invention, while FIG. 4 describes the second installation authorization method in the embodiment of the invention. FIG. 15 is a process flowchart for the second authorization data generation method, whereas FIG. 16 is a process flowchart for the second installation authorization method. Both the second authorization data generation method and the second installation authorization method are described hereunder by clarifying their differences from the first authorization data generation method and the first installation authorization method, respectively.

As shown in FIG. 3, in the second authorization data generation method, input code-B is not encrypted and is used as part of the install key. Therefore, the install key is generated from input Code-A and Code-B at Step S204 in FIG. 15. Except for this, everything is the same as the first authorization data generation method.

As shown in FIG. 4, in the second installation authorization method, Code-B that composes the install key is not encrypted and processed as it is for comparison without being decrypted. Therefore, Code-B that is not encrypted is taken out from the install key at Step S214 in FIG. 16. Except for this, everything is the same as the first installation authorization method.

Figure 5:
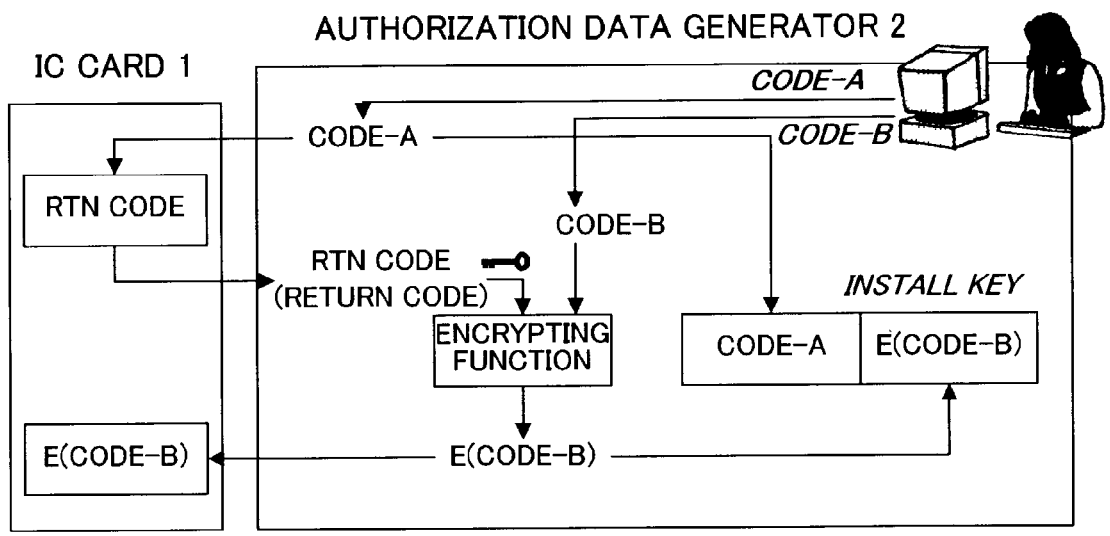
FIG. 5 illustrates a third authorization data generation method in the embodiment of the invention.
Figure 6:
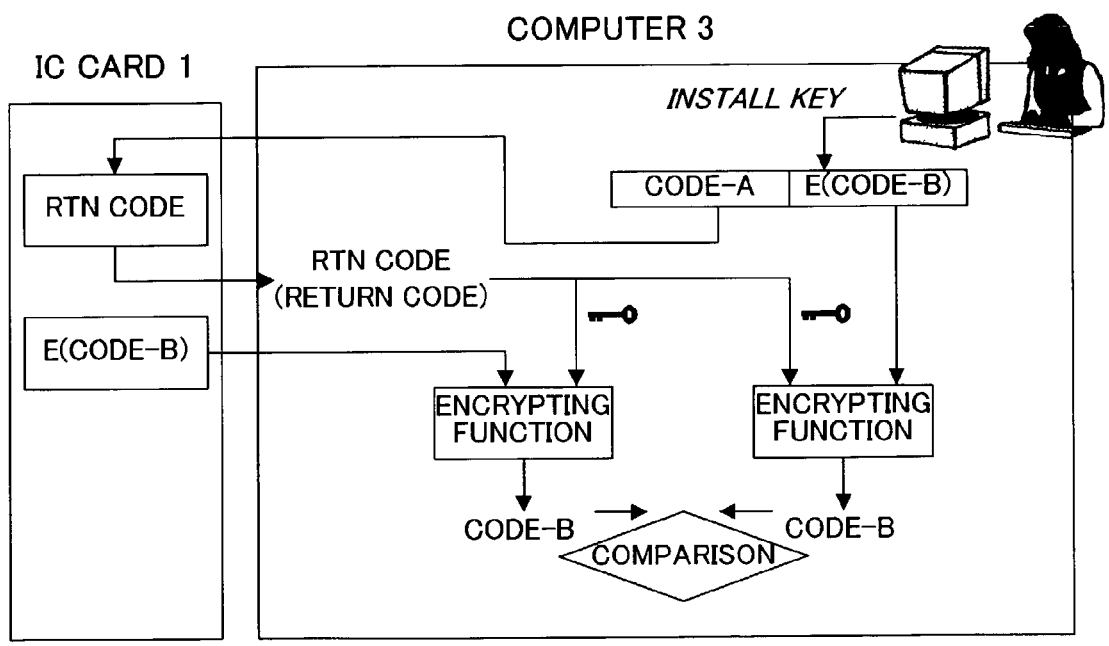
FIG. 6 illustrates a third installation authorization method in the embodiment of the invention.
Figure 17:
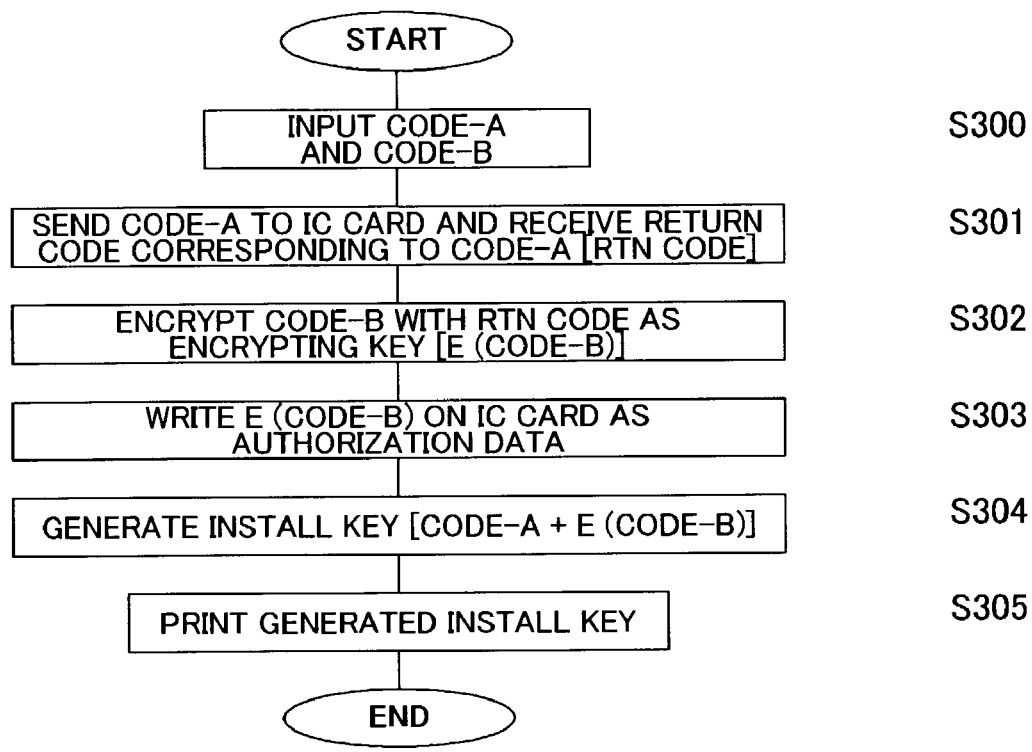
FIG. 17 is a process flowchart of the third authorization data generation method.
Figure 18:
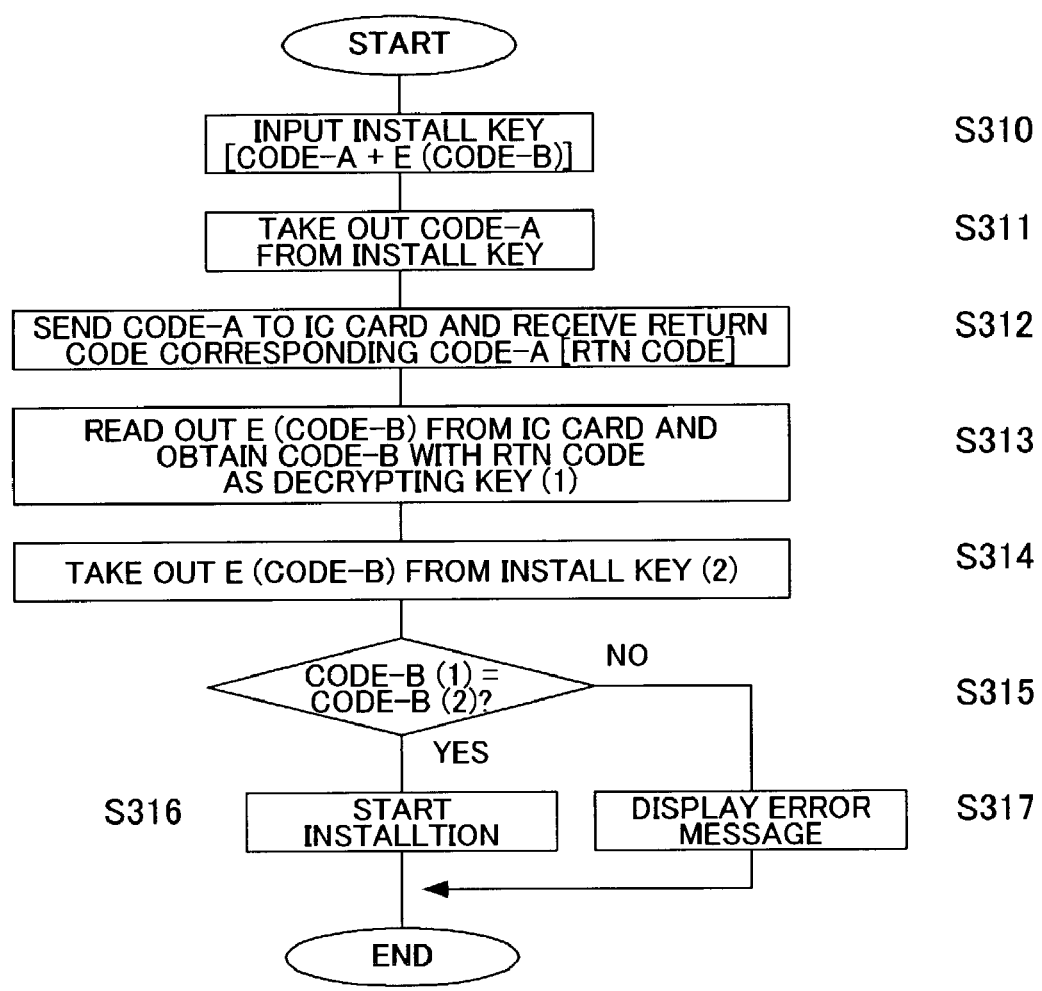
FIG. 18 is a process flowchart of the third installation authorization method.

FIG. 5 describes the third authorization data generation method in the embodiment of the invention, while FIG. 6 describes the third installation authorization method in the embodiment of the invention. FIG. 17 is a process flowchart for the third authorization data generation method, whereas FIG. 18 is a process flowchart for the third installation authorization method. Both the third authorization data generation method and the third installation authorization method are described hereunder by clarifying their differences from the first authorization data generation method and the first installation authorization method, respectively.

As shown in FIG. 5, in the third authorization data generation method, Code-A encrypted by the IC card is converted into return code RTN-Code-A by the specified code table, not by the encrypting function. The IC card stores a table that corresponds all codes-A to be input to their respective return codes RTN-Codes-A, takes out RTN Code-A corresponding to Code-A sent from the authorization data generator and returns it to the authorization data generator. In other words, instead of generating the encrypted key by encrypting Code-A by operation with the encrypting function, the encrypted key corresponding to Code-A is generated using the table prepared beforehand. Therefore, RTN-Code-A corresponding to input Code-A is returned at Step S301 in FIG. 17, while Code-B is encrypted by RTN-Code-A at Step S302. The install key is generated from Code-B. Except for this, everything is the same as the first authorization data generation method.

As shown at Steps S313 and S314 in FIGS. 6 and 18, in the third installation authorization method, E (Code-B) is decrypted by using RTN-Code-A corresponding to input Code-A as a decrypting key. Except for this, everything is the same as the first installation authorization method.

Figure 7:
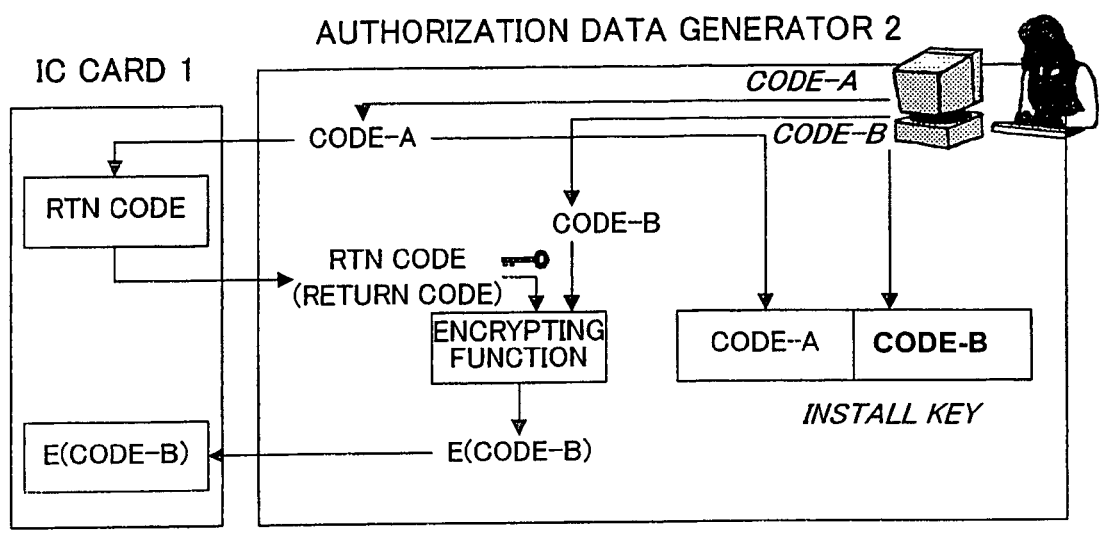
FIG. 7 illustrates a fourth authorization data generation method in the embodiment of the invention.
Figure 8:
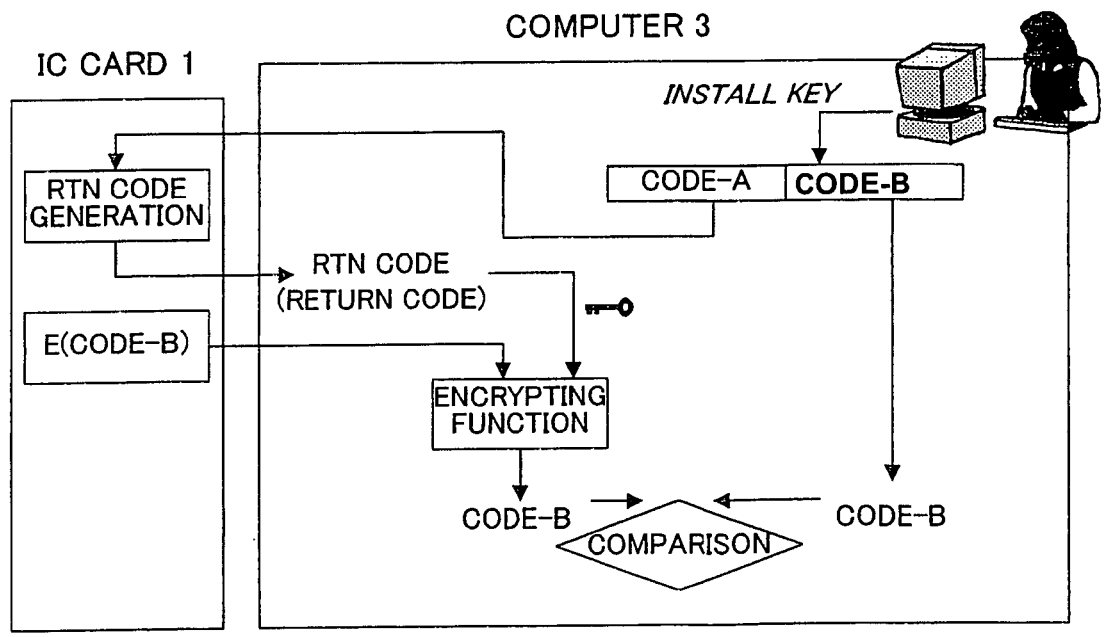
FIG. 8 illustrates a fourth installation authorization method in the embodiment of the invention.
Figure 19:
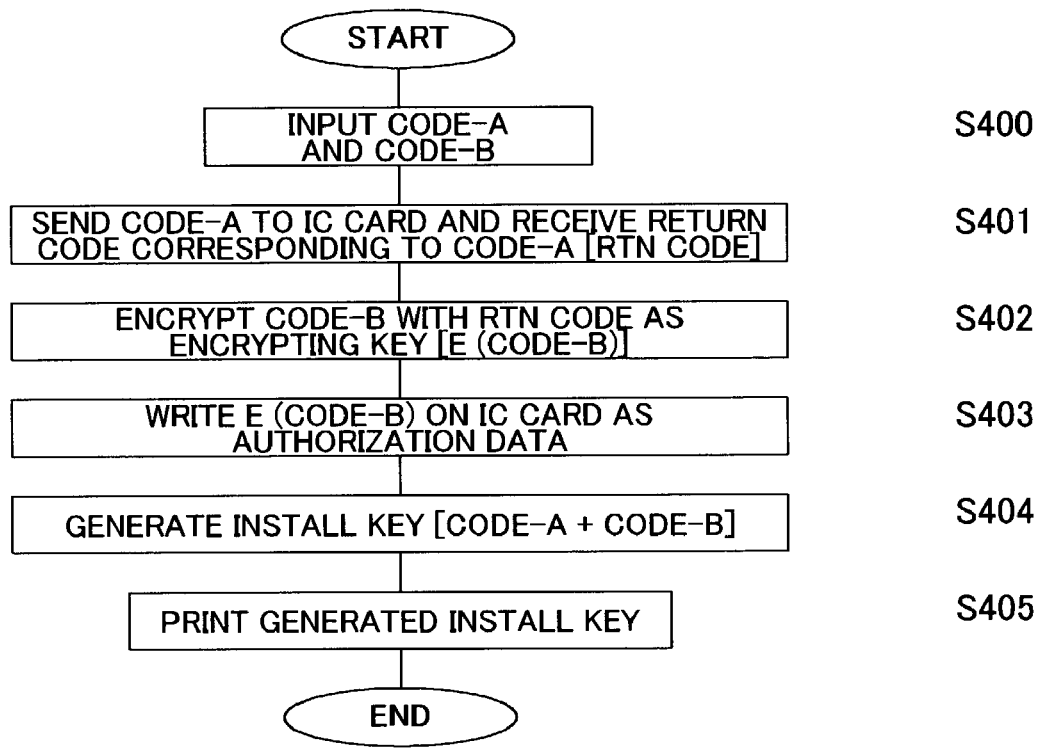
FIG. 19 a process flowchart of the fourth authorization data generation method.
Figure 20:
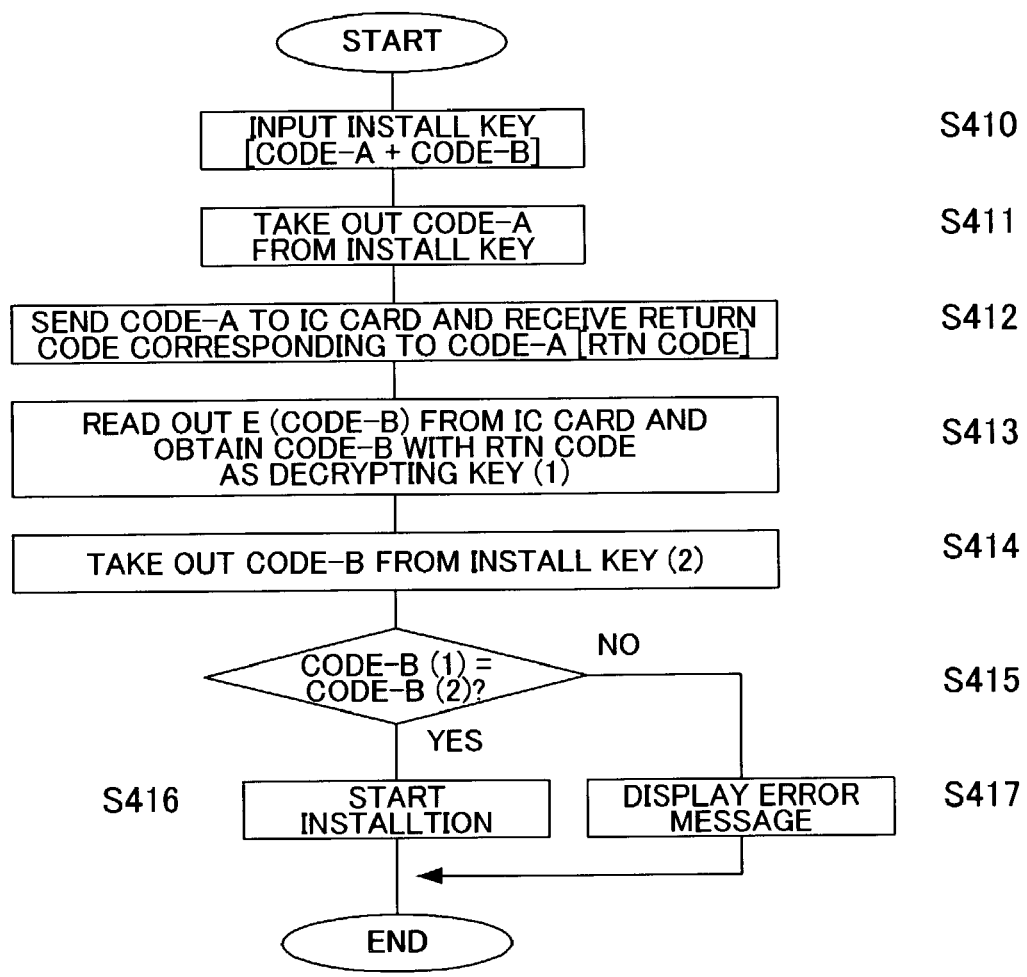
FIG. 20 is a process flowchart of the fourth installation authorization method.

FIG. 7 describes the fourth authorization data generation method in the embodiment of the invention, while FIG. 8 describes the fourth installation authorization method in the embodiment of the invention. FIG. 19 is a process flowchart for the fourth authorization data generation method, whereas FIG. 20 is a process flowchart for the fourth installation authorization method.

The fourth authorization data generation method is a combination of the second authorization data generation method and the third authorization data generation method. The fourth installation authorization method is a combination of the second installation authorization method and the third installation authorization method. In other words, Code-B is not encrypted and composes the install key, and Code-A is converted into RTN-Code-A by the table of the IC card, not by operation with the encrypting function.

Figure 9:
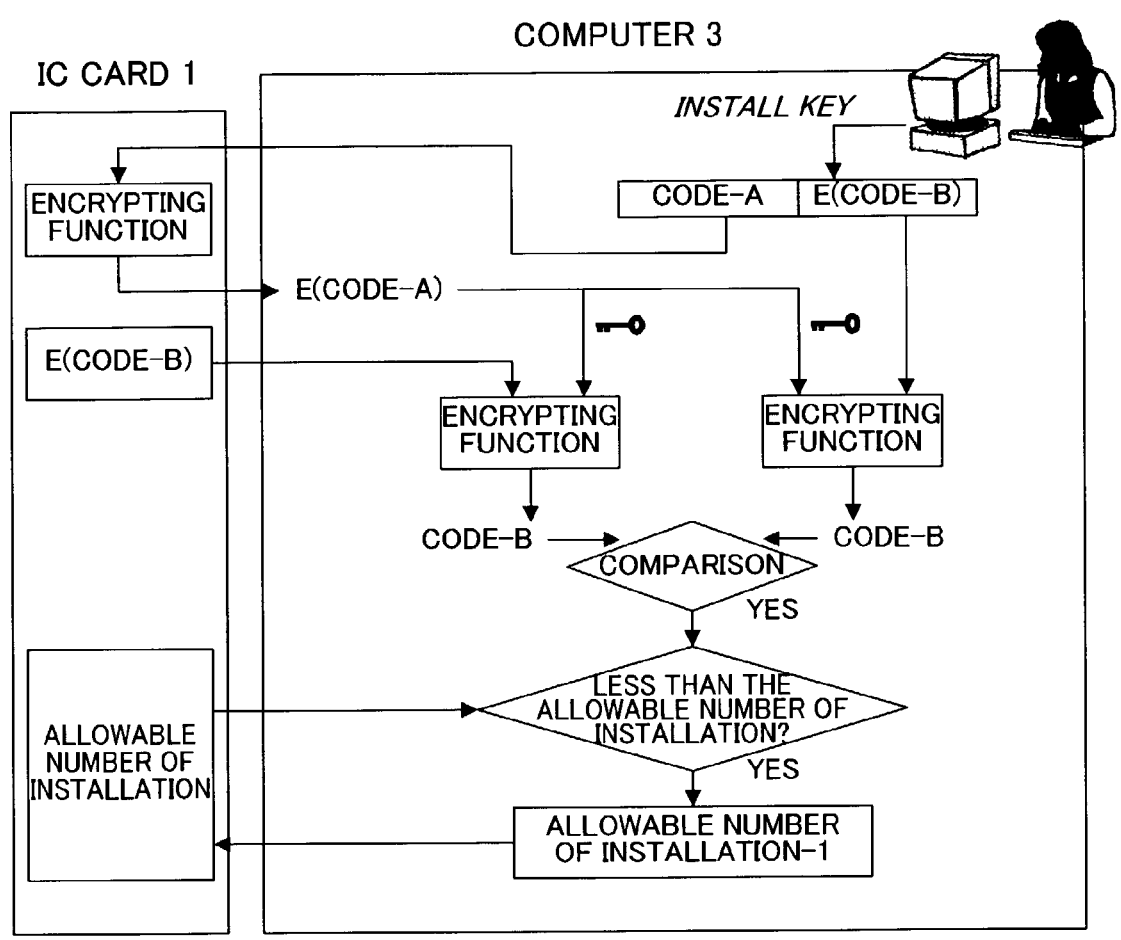
FIG. 9 illustrates a fifth installation authorization method in the embodiment of the invention.

FIG. 9 describes the fifth installation authorization method in the embodiment of the invention. In the fifth installation authorization method, the process for determining authorization/rejection by the allowable number of installation is added to the process for the first installation authorization method.

Figure 21:
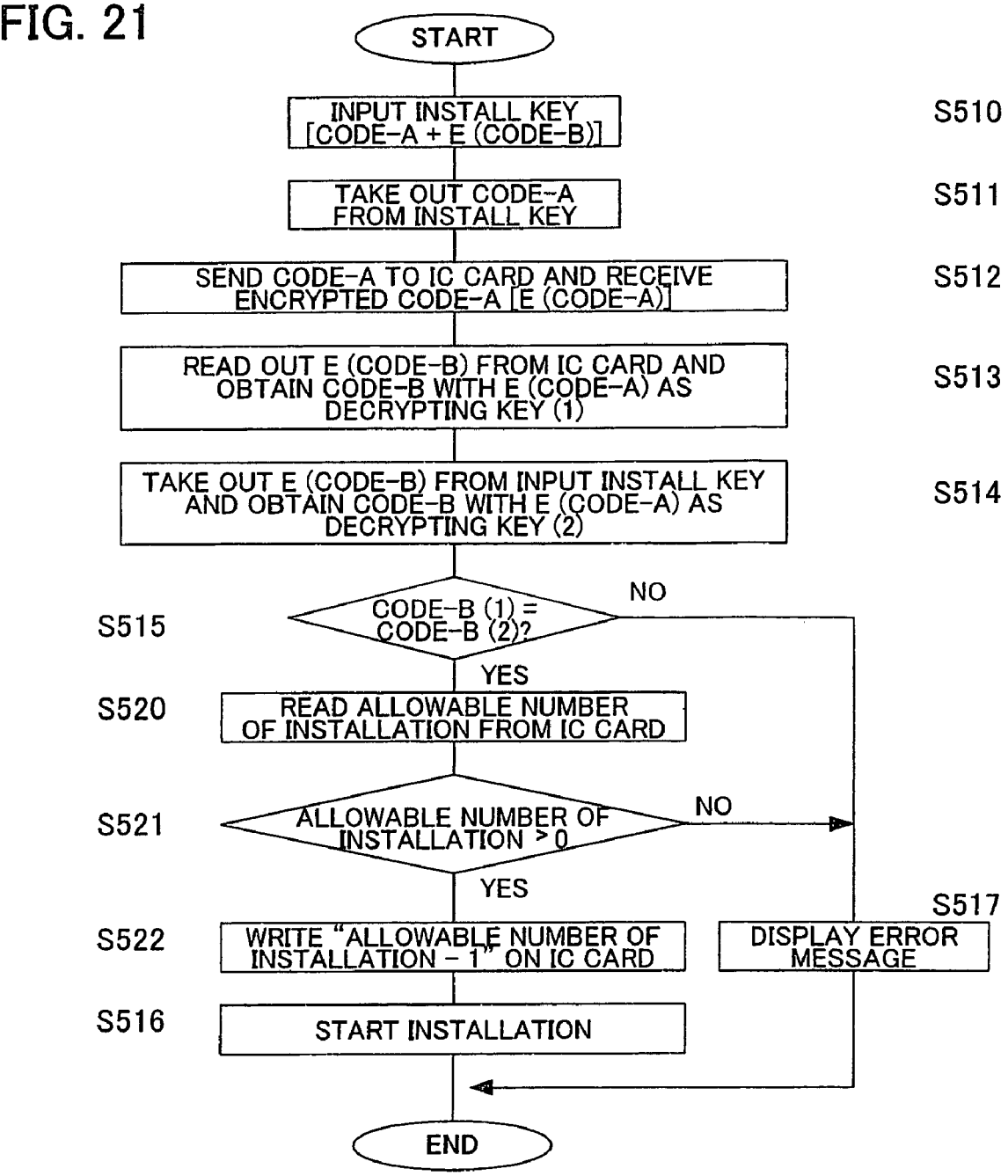
FIG. 21 is a process flowchart of the fifth installation authorization method.

FIG. 21 is a process flowchart for the fifth installation authorization method. Steps S510 and S515 in FIG. 21 are the same as the processes of Steps S110 and S115 in the first installation authorization method shown in FIG. 13. If Codes-B correspond with each other at Step S515, the allowable number of installation written in advance on the IC card is read out (S520). If the allowable number of installation is larger than 0, the read number of installation subtracted by 1 is written on the IC card as the newly allowable number of installation (S522), and the program installation is started (S516). If the allowable number of installation is 0, an error occurs (S517).

By setting the allowable number of installation, the program cannot be installed on the number of computers greater than the preset number, thereby preventing unlimited program installation.

Furthermore, in the embodiment of the invention, by using the generated install key, not only installation authorization is carried out at the time of the program installation, but also authorization requiring the IC card is performed whenever the program installed thereafter is started.

Figure 10A:
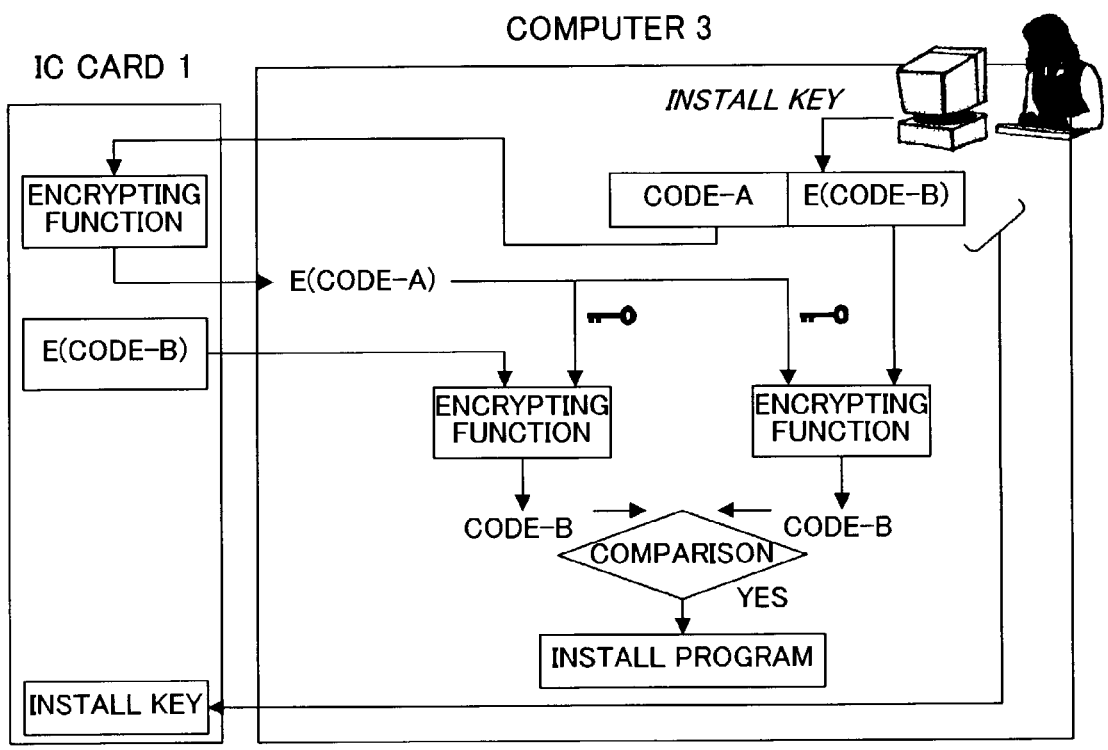
FIGS. 10A and 10B illustrate a first start authorization processing method in the embodiment of the invention.
Figure 10B:
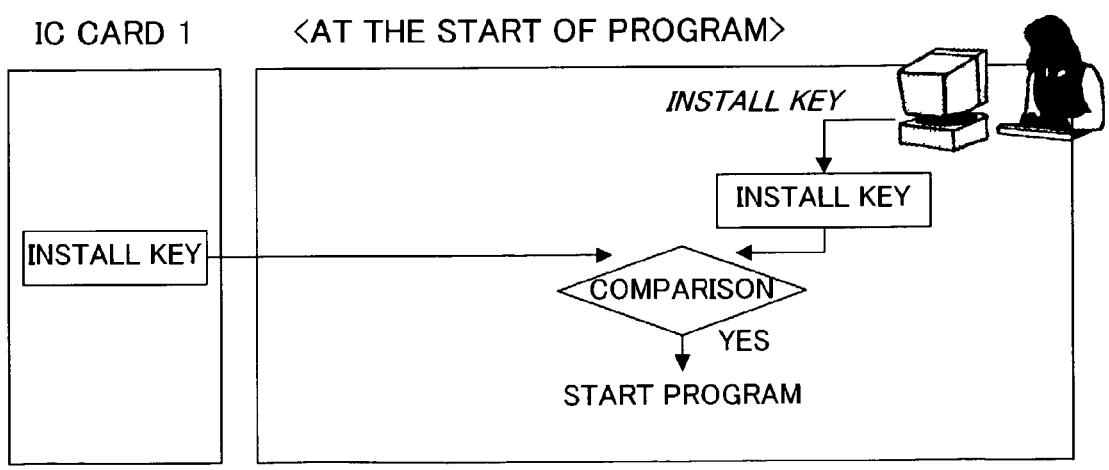
Figure 22A:
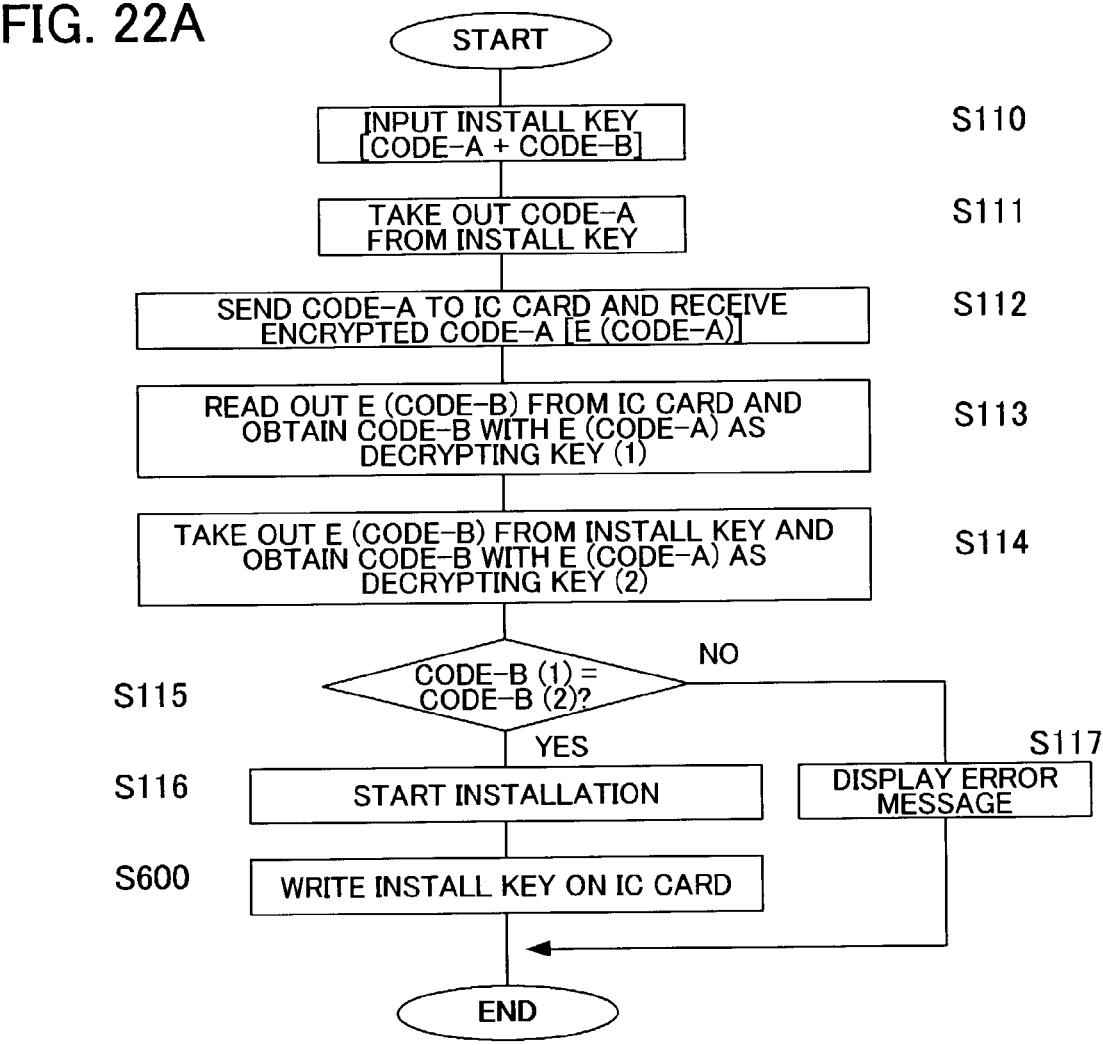
FIGS. 22A and 22B are process flowcharts of the first start authorization processing method.
Figure 22B:
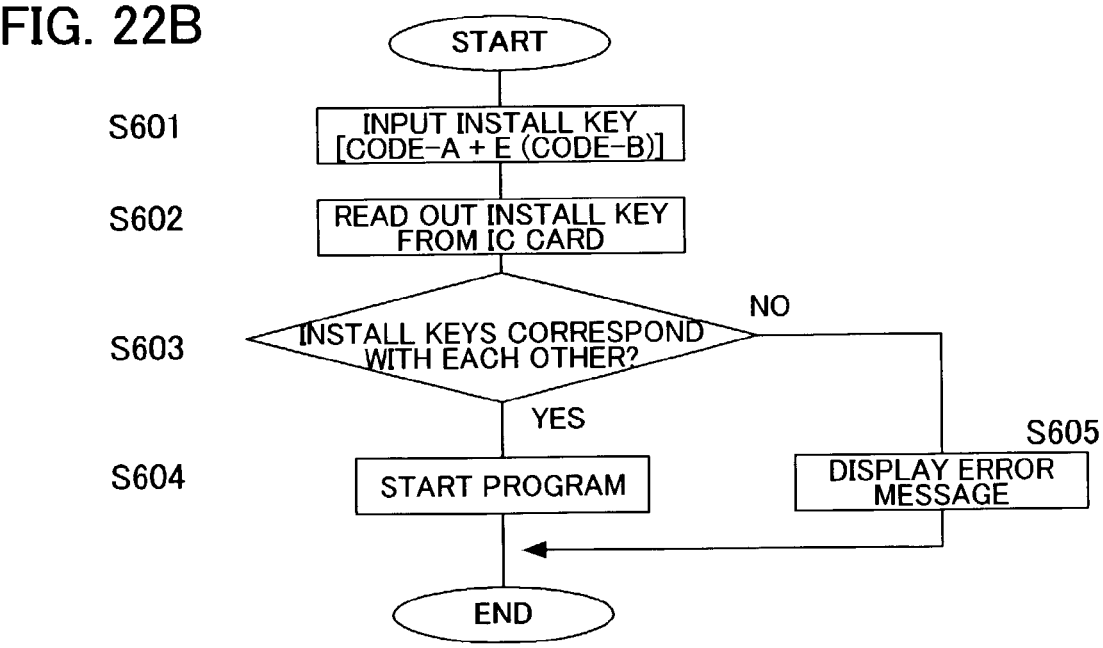

FIGS. 10A and 10B describe the first start authorization processing method in the embodiment of the invention, and FIGS. 22A and 22B are flowcharts for the first start authorization processing method. FIG. 10A and FIG. 22A show the process when a program is installed, while FIG. 10B and FIG. 22B show the process when the program is started. They are described on the basis of FIGS. 22A and 22B, referring to FIGS. 10A and 10B. In FIG. 22A, for example, if the installation is authorized by the first installation authorization process (from S110 to S116), the process of writing the install key on the IC card is executed at the time of installation (S600).

In FIG. 22B, if a command to start the program is given after the installation, the start authorization program in the main program starts, obtains the install key input by the user (S601), reads out the install key stored in the IC card (S602), and compares both the keys (S603). If they correspond with each other, the main program is started (S604). If not, an error occurs (S605), and the main program is not started.

Figure 11A:
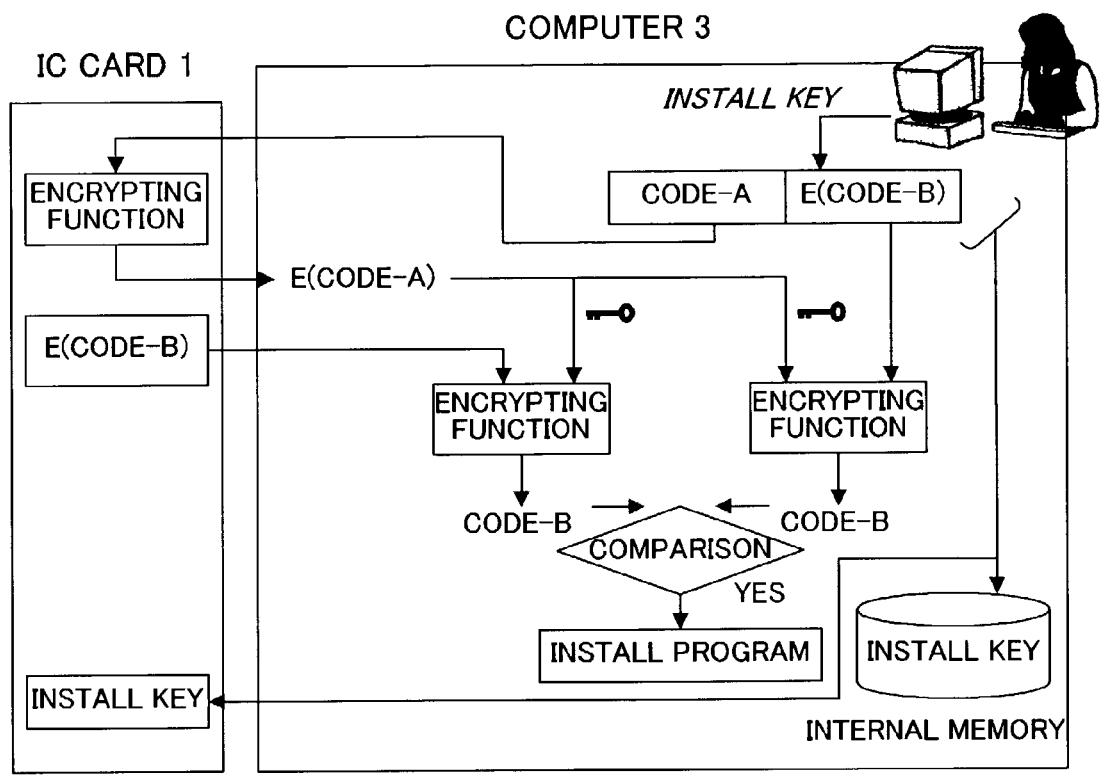
FIGS. 11A and 11B illustrate a second start authorization processing method in the embodiment of the invention.
Figure 11B:
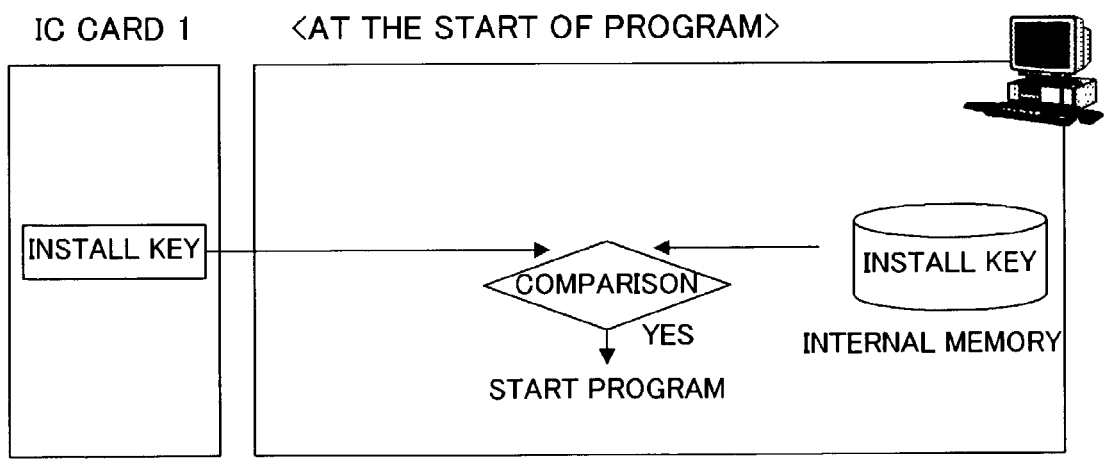
Figure 23A:
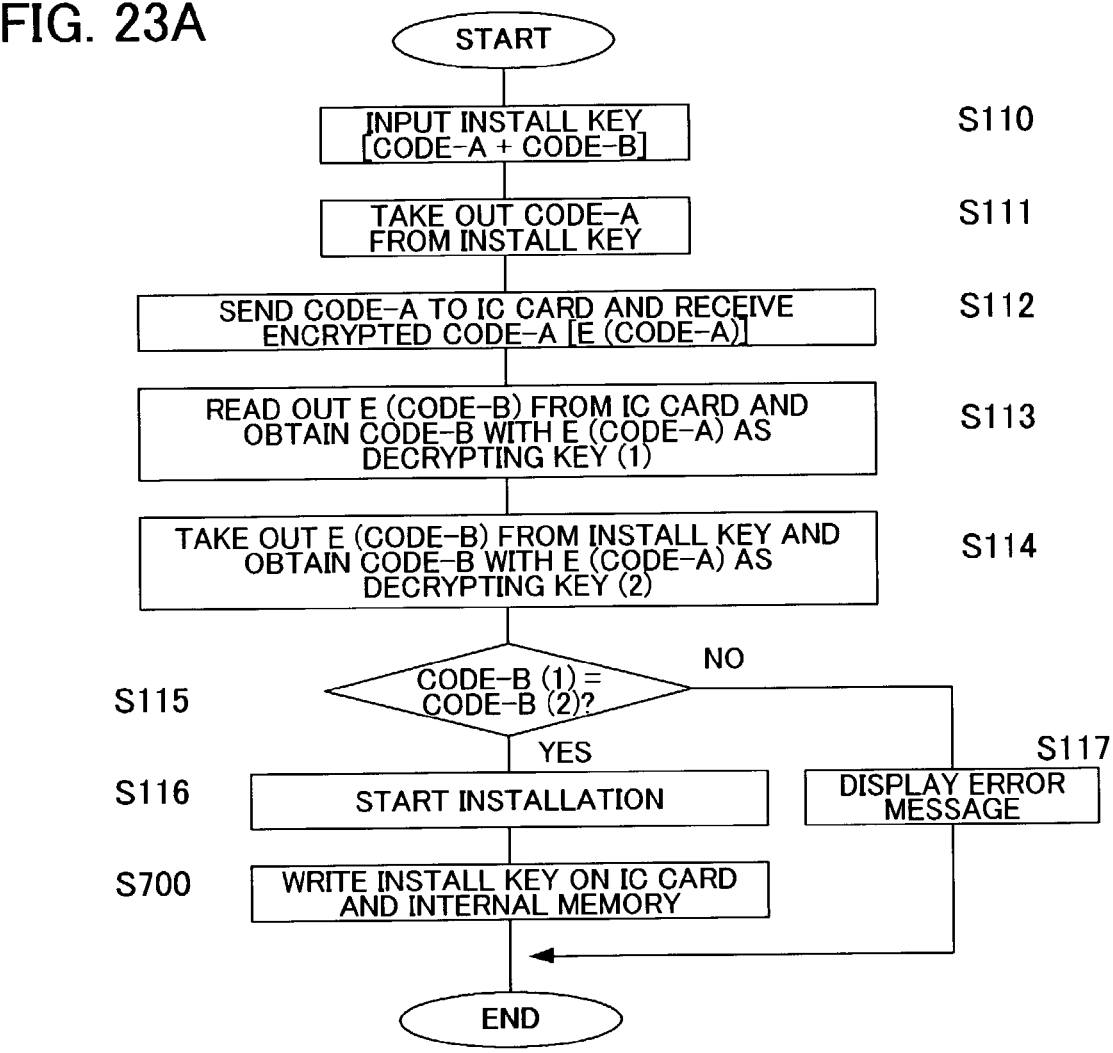
FIGS. 23A and 23B are process flowcharts of the second start authorization processing method.
Figure 23B:
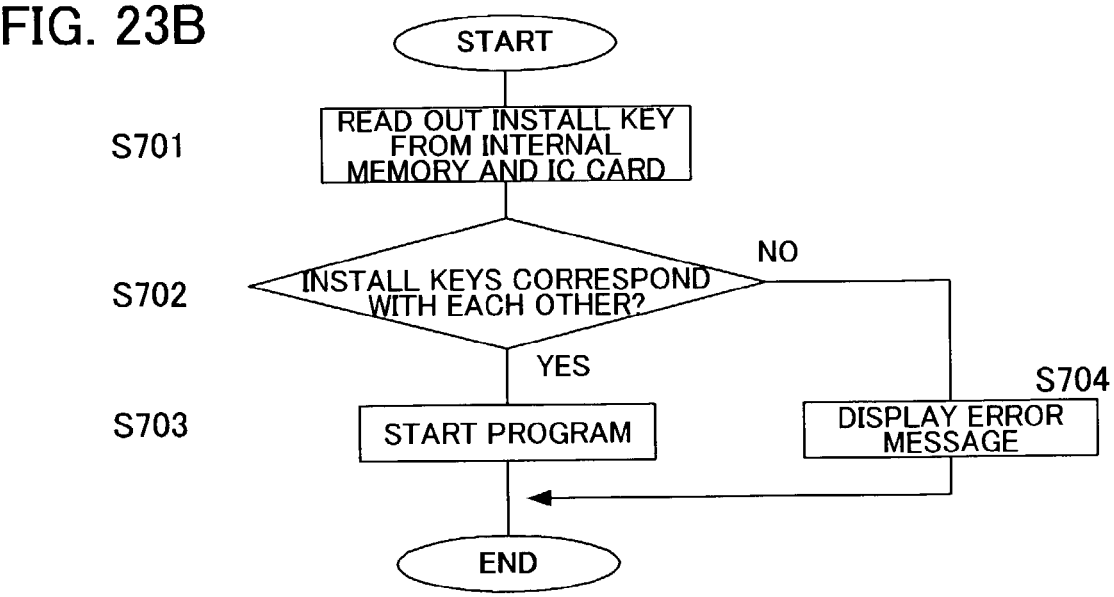

FIGS. 11A and 11B describe the second start authorization processing method in the embodiment of the invention, and FIGS. 23A and 23B are flowcharts for the second start authorization processing method. FIG. 11A and FIG. 23A show the process when a program is installed, while FIG. 11B and FIG. 23B show the process when the program is started. They are described on the basis of FIGS. 23A and 23B, referring to FIGS. 11A and 11B. In FIG. 23A, for example, if the installation is authorized by the first installation authorization process (from S110 to S116), the process of writing the install key on both the IC card and the internal memory (for example, the hard disk drive) of the computer on which the program is installed is executed at the time of installation (S700).

In FIG. 23B, if a command to start the program is given after the installation, the start authorization program in the main program starts, reads out the respective install keys stored in the internal memory of the computer and the IC card (S701), and compares both the keys (S702). If they correspond with each other, the main program is started (S703). If not, an error occurs (S704), and the main program is not started. Compared with the first start authorization process, in the second start authorization process, because the install key is written on not only the IC card but also the internal memory of the computer, it is not necessary for the user to input the install key, and the start authorization is automatically executed.

Figure 12A:
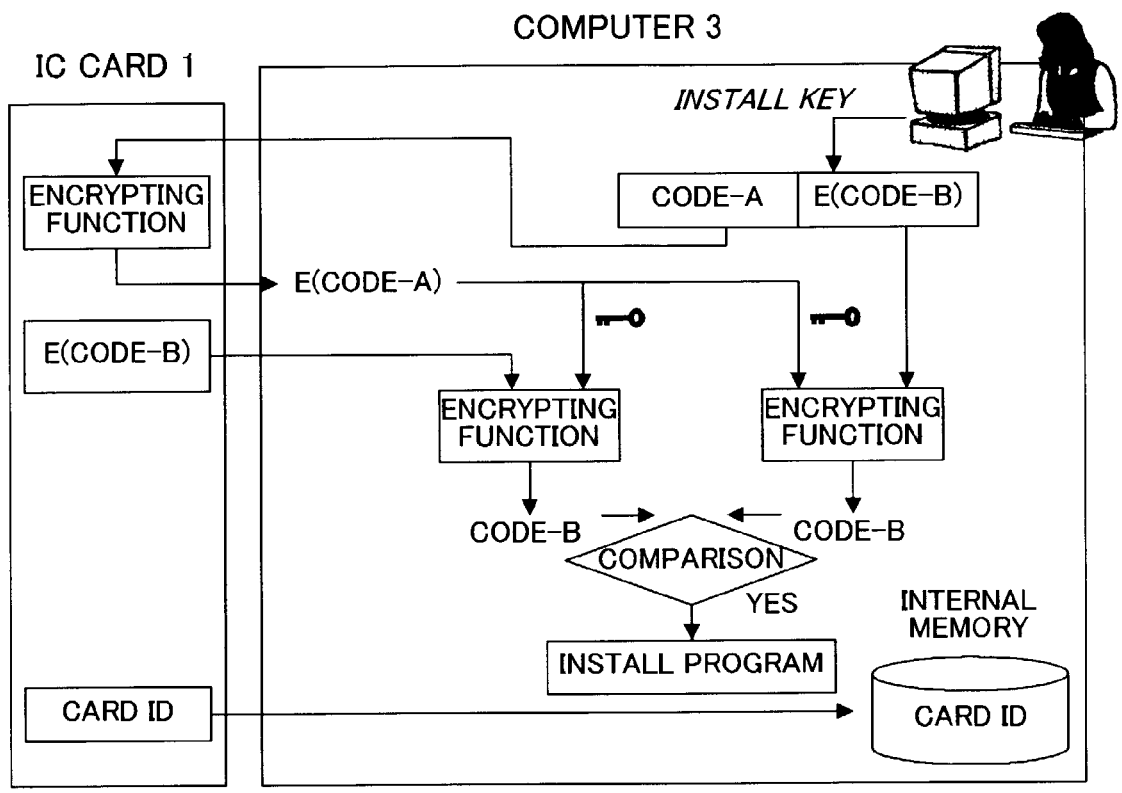
FIGS. 12A and 12B illustrate a third start authorization processing method in the embodiment of the invention.
Figure 12B:
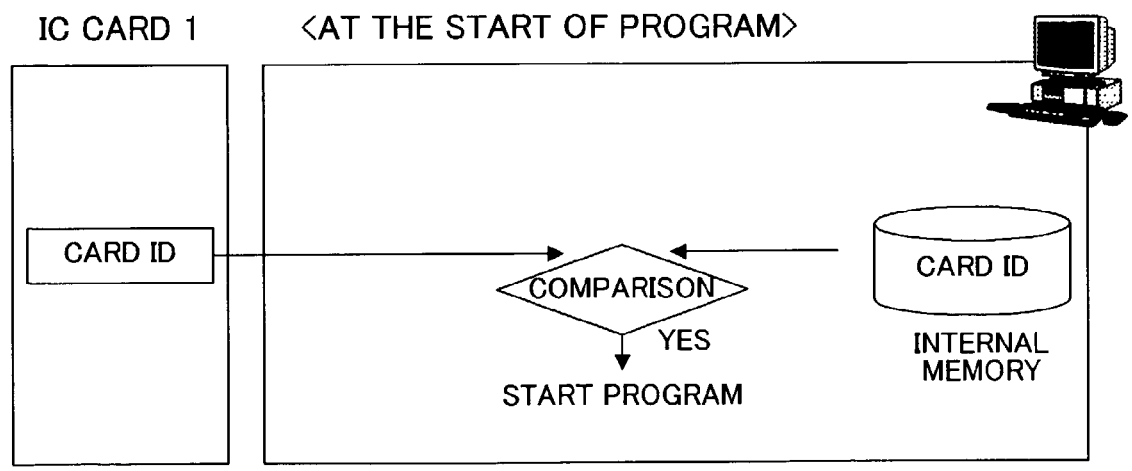
Figure 24A:
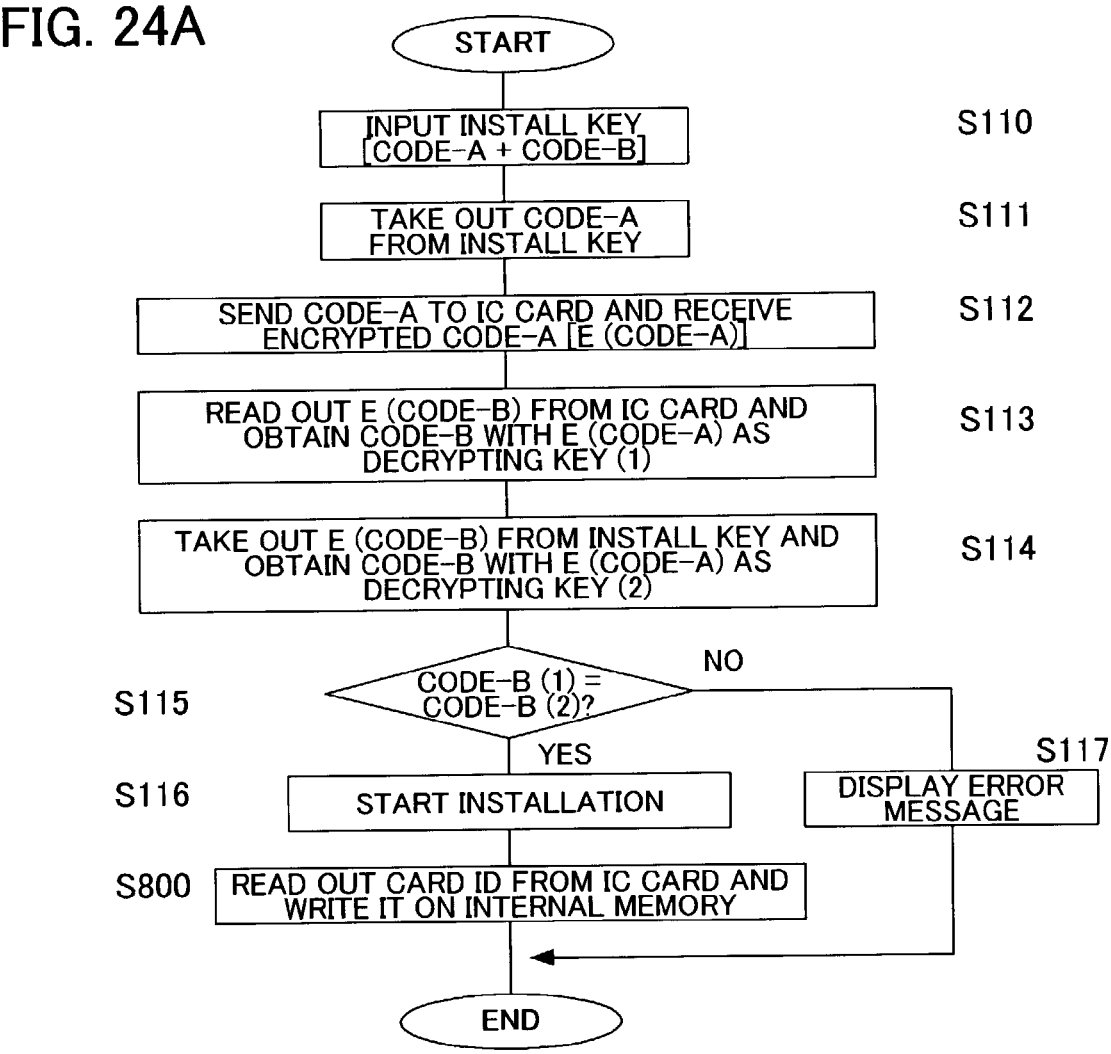
FIGS. 24A and 24B are process flowcharts of the third start authorization processing method.
Figure 24B:
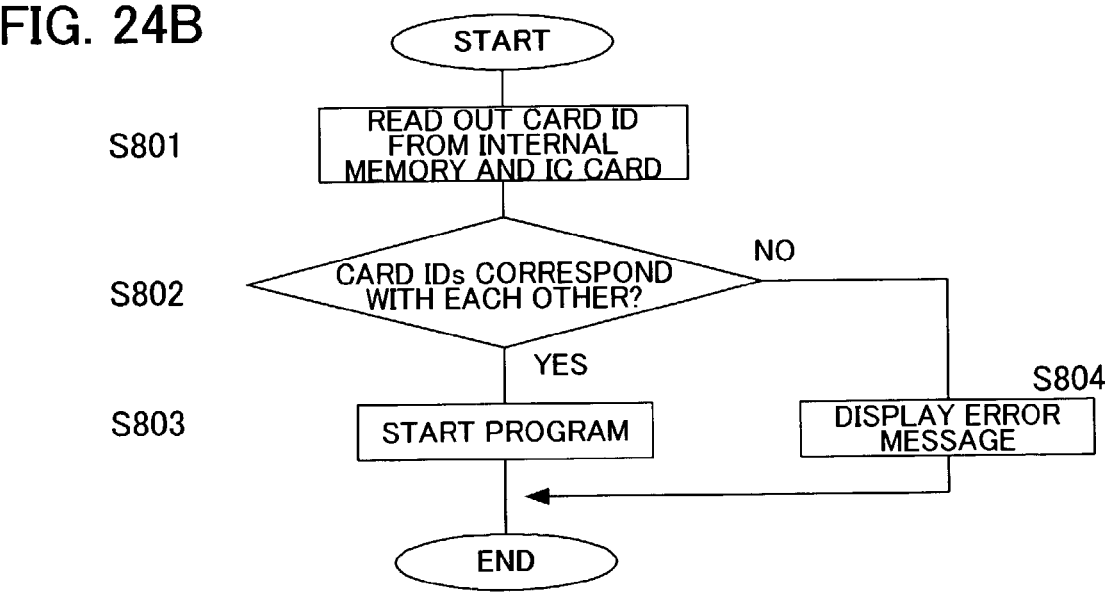

FIGS. 12A and 12B describe the third start authorization processing method in the embodiment of the invention, and FIGS. 24A and 24B are flowcharts for the third start authorization processing method. FIG. 12A and FIG. 24A show the process when a program is installed, while FIG. 12B and FIG. 24B show the process when the program is started. They are described on the basis of FIGS. 24A and 24B, referring to FIGS. 12A and 12B. In FIG. 24A, for example, if the installation is authorized by the first installation authorization process (from S110 to S116), the ID (card ID) pre-stored in the IC card and specific to the IC card is read out, and the process of writing the card ID on the internal memory of the computer on which the program is installed is executed at the time of installation (S800).

In FIG. 24B, if a command to start the program is given after the installation, the start authorization program in the main program starts, reads out the respective card IDs stored in the internal memory of the computer and the IC card (S801), and compares both the IDs (S802). If they correspond with each other, the main program is started (S803). If not, an error occurs (S804), and the main program is not started. Compared with the second start authorization process, the third start authorization process uses the card ID of the IC card instead of the install key.

As shown above, the authorization process using an IC card is adopted even when a program is started. Therefore, even if the program is installed illegally, the program cannot be started without the IC card, thereby preventing illegal use of the program.

More specifically, by requiring the IC card at the time of start as well as at the time of installation, for example, the following illegal use of the program can be prevented. In other words, an unauthorized user illegally takes out the IC card and installs the program illegally without the approval of the authorized user. Then, the unauthorized user returns the IC card without being noticed. In the case where the IC card is required only at the time of installation, the unauthorized user can freely execute the program thereafter without being noticed by the authorized user once installing the program. However, by requiring the IC card at the time of program start, it is necessary to take out the IC card illegally whenever the program is started, thereby increasing the possibility of detecting the illegal conduct, and effectively preventing illegal use of the program.

Furthermore, In the embodiment of the invention, to increase the level of prevention of illegal use of a program, the authorization process requiring an IC card even during the program execution after the start of the program is executed. More specifically, when the main program is started, the on-the-fly authorization program in the main program is also started to execute the following authorization process at given intervals.

Figure 25:
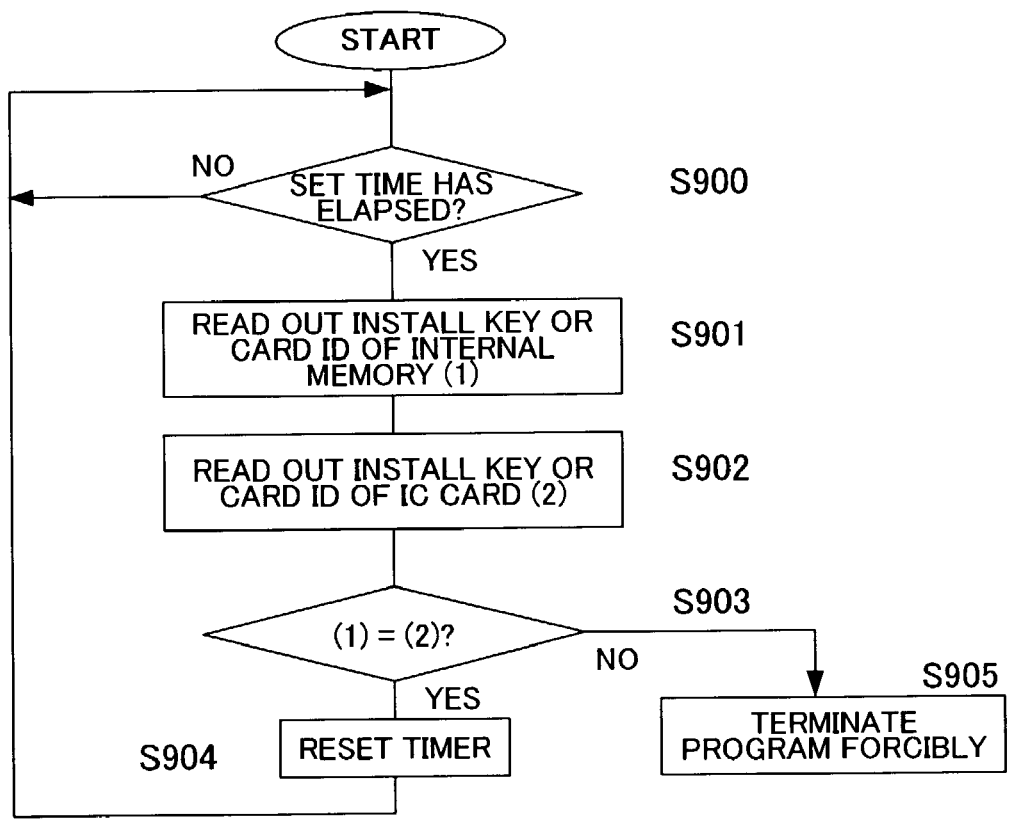
FIG. 25 is a flowchart of an on-the-fly authorization processing in the embodiment of the invention.

FIG. 25 is an on-the-fly authorization process flowchart. In FIG. 25, after the start or after a given time elapses from the previous authorization process (S900), the install key (in the case of the first and second authorization processes) stored in the internal memory of the computer, or the card ID (in the case of the third authorization process) is read out (S902), both are compared (S903). If they correspond with each other, the timer is reset (S904), and the program execution is authorized. If not (including the case where the install key stored in the IC card or the card ID cannot be read), the program is forcibly terminated (S905).

If the above first start authorization process is used as the authorization process at the time of start, the computer retains the install key input by the user in the internal memory.

The interval at which the on-the-fly authorization process is executed may be a preset fixed interval or a variable interval. Information on this interval may be written on the IC card or possessed by the on-the-fly authorization process program itself. If the information on the interval is written on the IC card, the on-the-fly authorization process program obtains the interval information from the IC card at the time of start.

As shown above, the embodiment of the invention adopts the authorization process with the IC card even during the execution of the program after the program is started. Therefore, the embodiment makes it more difficult to use the program illegally. Also, it is very suitable for the case where using the program at the same time on more than one computer should be prohibited although it is allowed to install the program on more than one computer.

In the embodiment, the memory medium to store authorization data is not limited to an IC card, and may be a memory medium of other type, for example, a memory medium that can be connected directly to a USB port or an RS232C port. Also, the IC card may be of the contact type or non-contact type. If a contact type IC card is used, it may be connected to the computer directly or via the reader/writer of the IC card.

According to the invention, because the process for authorizing the program use (installation, start and execution) is executed on the basis of the relationship between the authorization data and an install key input externally (identification information specific to the program), using a memory medium that contains authorization data, illegal use of the program can be prevented.

In particular, by executing an authorization process that requires a memory medium even while a program is executed, the program can be prevented from being executed at the same time on more than one computer.

The scope of protection of the present invention is not limited to the above embodiments, but covers the inventions defined in the claims, as well as their equivalents.

What is claimed is:

1. A program use authorization method for authorizing the use of programs on a computer, using a memory medium connected to the computer, the method comprising:

accepting an input of an install key generated on the basis of first and second codes specific to each program;

sending the first code contained in the install key to the memory medium, and receiving a first encrypted code generated by encrypting the first code by the memory medium;

reading out a second encrypted code generated by encrypting the second code by the first code and stored in the memory medium; and executing installation authorization regarding authorization/rejection of the program installation on the basis of the relationship between the install key and the second encrypted code;

wherein the install key is a combination of the first code and the second encrypted code; and the executing installation authorization includes decrypting the second encrypted code contained in the install key, and the second encrypted code read out from the memory medium, into second codes using the received first encrypted code, and determining agreement/disagreement between the two decrypted second codes.

2. The program use authorization method according to claim 1, wherein the second encrypted code is generated by encrypting the second code by the first encrypted code generated by encrypting the first code in the memory medium.

3. The program use authorization method according to claim 1, wherein the memory medium encrypts the first code by a given function for encrypting.

4. The program use authorization method according to claim 2, wherein the memory medium has a table of the first encrypted codes corresponding to the first codes.

5. The program use authorization method according to claim 1, further comprising:
reading out information on an allowable number of installation stored in the memory medium;
wherein the executing the installation authorization includes executing authorization regarding authorization/rejection of the program installation on the basis of the allowable number of installation read out at the installation authorization as well as the relationship between the install key and the second encrypted code.

6. The program use authorization method according to claim 1, further comprising:
executing a start authorization regarding authorization/rejection of the start of the program using information stored in the memory medium when the installed program is started after installation is authorized at the executing the installation authorization and the program is installed on the computer.

7. The program use authorization method according to claim 6, further comprising:
storing the install key as the information in the memory medium while installing the program on the computer when the installation is authorized at the installation authorization;
wherein the start authorization includes reading out the install key stored in the memory medium, and on the basis of the comparison between the read install key and the externally input install key, executing authorization regarding authorization/rejection of the start of the program.

8. The program use authorization method according to claim 6, further comprising:
storing the install key as the information in the memory medium while installing the program on the computer when the installation is authorized at the installation authorization;
wherein the start authorization includes reading out the install keys stored in the memory medium and the computer, and, on the basis of the comparison between the two install keys, executing authorization regarding authorization/rejection of the start of the program.

9. The program use authorization method according to claim 6, further comprising:
storing identification information in the computer, after reading out the identification information to identify the memory medium, as the information while installing the program on the computer when the installation is authorized at the installation authorization;
wherein the start authorization includes reading out the identification information stored in the memory medium and the computer, and, on the basis of the comparison between the two pieces of identification information, executing authorization regarding authorization/rejection of the start of the program.

10. The program use authorization method according to claim 6, further comprising:
executing authorization regarding authorization/rejection of the program execution using information stored in the memory medium while the program is executed after the start of the program is authorized at the start authorization and the program is started.

11. The program use authorization method according to claim 7, further comprising:
executing authorization regarding authorization/rejection of the program execution on the basis of the comparison between the install key read out and the install key input externally and retained after reading out the install key stored in the memory medium, while the program is executed after the start of the program is authorized at the start authorization and the program is started.

12. The program use authorization method according to claim 8, further comprising:
executing authorization regarding authorization/rejection of the program execution on the basis of the comparison between the two install keys after reading out the install keys stored in the memory medium and the computer, while the program is executed after the start of the program is authorized at the start authorization and the program is started.

13. The program use authorization method according to claim 9, further comprising:
executing authorization regarding authorization/rejection of the program execution on the basis of the comparison between the two pieces of identification information after reading out the identification information stored in the memory medium and the computer, while the program is executed after the start of the program is authorized at the start authorization and the program is started.

14. The program use authorization method according to claim 10, wherein the executing the authorization is executed at given intervals.

15. The program use authorization method according to claim 1, wherein the memory medium is an IC card.

16. A program stored on a computer readable medium allowing a computer to execute the program authorization method according to claim 1.

17. A program use authorization method for authorizing the use of programs on a computer, using a memory medium connected to the computer, the method comprising:
accepting an input of an install key generated on the basis of first and second codes specific to each program;
sending the first code contained in the install key to the memory medium, and receiving a first encrypted code generated by encrypting the first code by the memory medium;
reading out a second encrypted code generated by encrypting the second code by the first code and stored in the memory medium; and
executing installation authorization regarding authorization/rejection of the program installation on the basis of the relationship between the install key and the second encrypted code;
wherein the install key is a combination of the first code and the second code; and
the executing installation authorization includes decrypting the second encrypted code, read out from the memory medium, into the second code using the received first encrypted code, and determining agreement/disagreement between the decrypted second code and the second code contained in the install key.

* * * * *